US010660153B1

(12) United States Patent
Li et al.

(10) Patent No.: US 10,660,153 B1
(45) Date of Patent: May 19, 2020

(54) EMERGENCY CALL SUPPORT USING MULTIPLE NETWORK TECHNOLOGIES

(71) Applicant: Verizon Patent and Licensing Inc., Arlington, VA (US)

(72) Inventors: Mingxing Li, San Jose, CA (US); Sudhakar Reddy Patil, Flower Mound, TX (US); Deepa Jagannatha, Bridgewater, NJ (US); Lily Zhu, Parsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/214,287

(22) Filed: Dec. 10, 2018

(51) Int. Cl.
*H04W 76/50* (2018.01)
*H04W 76/16* (2018.01)
*H04W 36/30* (2009.01)
*H04W 36/12* (2009.01)
*H04W 88/06* (2009.01)

(52) U.S. Cl.
CPC ......... *H04W 76/50* (2018.02); *H04W 36/125* (2018.08); *H04W 36/305* (2018.08); *H04W 76/16* (2018.02); *H04W 88/06* (2013.01)

(58) Field of Classification Search
CPC ........... H04W 36/0022; H04W 36/305; H04W 36/125; H04W 4/90; H04W 76/50; H04W 76/30; H04W 76/16; H04W 36/0066; H04W 88/06; H04M 2207/45; H04M 3/42348

See application file for complete search history.

(56) References Cited

U.S. PATENT DOCUMENTS

| 2015/0245388 A1* | 8/2015 | Yerrabommanahalli ................... H04W 4/90 455/404.1 |
| 2019/0053010 A1* | 2/2019 | Edge ..................... H04W 4/029 |
| 2019/0053028 A1* | 2/2019 | Chandramouli ........ H04W 4/90 |

OTHER PUBLICATIONS

ETSI TS 123 502 V15.3.0 (Sep. 2018)—5G; Procedures for the 5G System (3GPP TS 23.502 version 15.3.0 Release 15) (Year: 2018).*

* cited by examiner

*Primary Examiner* — Nizar N Sivji

(57) ABSTRACT

A device may connect to a first wireless network; determine whether the first wireless network provides a particular service for determining a position of the device; select the first wireless network as a primary network if the first wireless network provides the particular service for determining a position of the device, or select the second wireless network as the primary network if the first wireless network does not provide the particular service for determining a position of the device. If the device selects the first wireless network as the primary network, the device may send a first request to the first wireless network to make a first emergency call to an endpoint over the first wireless network.

20 Claims, 10 Drawing Sheets

EMERGENCY CALL SUPPORT USING MULTIPLE NETWORK TECHNOLOGIES

BACKGROUND

UE devices associated with a Long Term Evolution (LTE) network may have the capability to communicate via a Fifth Generation (5G) New Radio (NR) system. For example, an Evolved Universal Terrestrial Radio Access New Radio Dual Connectivity (EN-DC) device has the capability to exchange data with an LTE wireless station, as well as exchange data with a 5G next generation wireless station. 4G UE devices, 5G NR devices, and other more advanced network-compatible devices may not only be capable of communicating with their networks at breakneck speeds, but may also leverage their networks to provide services unavailable in other networks. For example, such devices can be used to place emergency calls over 5G or 4G networks.

DETAILED DESCRIPTION OF PREFERRED EMBODIMENTS

The following detailed description refers to the accompanying drawings. The same reference numbers in different drawings may identify the same or similar elements.

In implementations described herein, a user equipment (UE) device may use multiple radio access technologies (RATs) to place an emergency call. In particular, depending on the capabilities and operating conditions of different networks, the UE device designates a primary network for placing an emergency call. If the primary network fails to connect the UE device to a Public Safety Answering Point (PSAP), the UE device attempts to use other networks, in turn as failover networks, to make the call.

In selecting the primary network, the UE device may evaluate multiple factors. Examples of the factors include: whether a network supports emergency call service and/or emergency call service fallback; availability of a highly precise positioning service; call drop rates; network congestion; jitter; latency; etc. In one implementation, the UE device may use the information on whether a network supports emergency call service or emergency call service fallback to designate the primary network. Alternatively or additionally, the UE device may use the availability of highly precise positioning services as the determinant in designating the primary network. The primary network may provide precise coordinates of the UE device to the PSAP.

Figure 1:
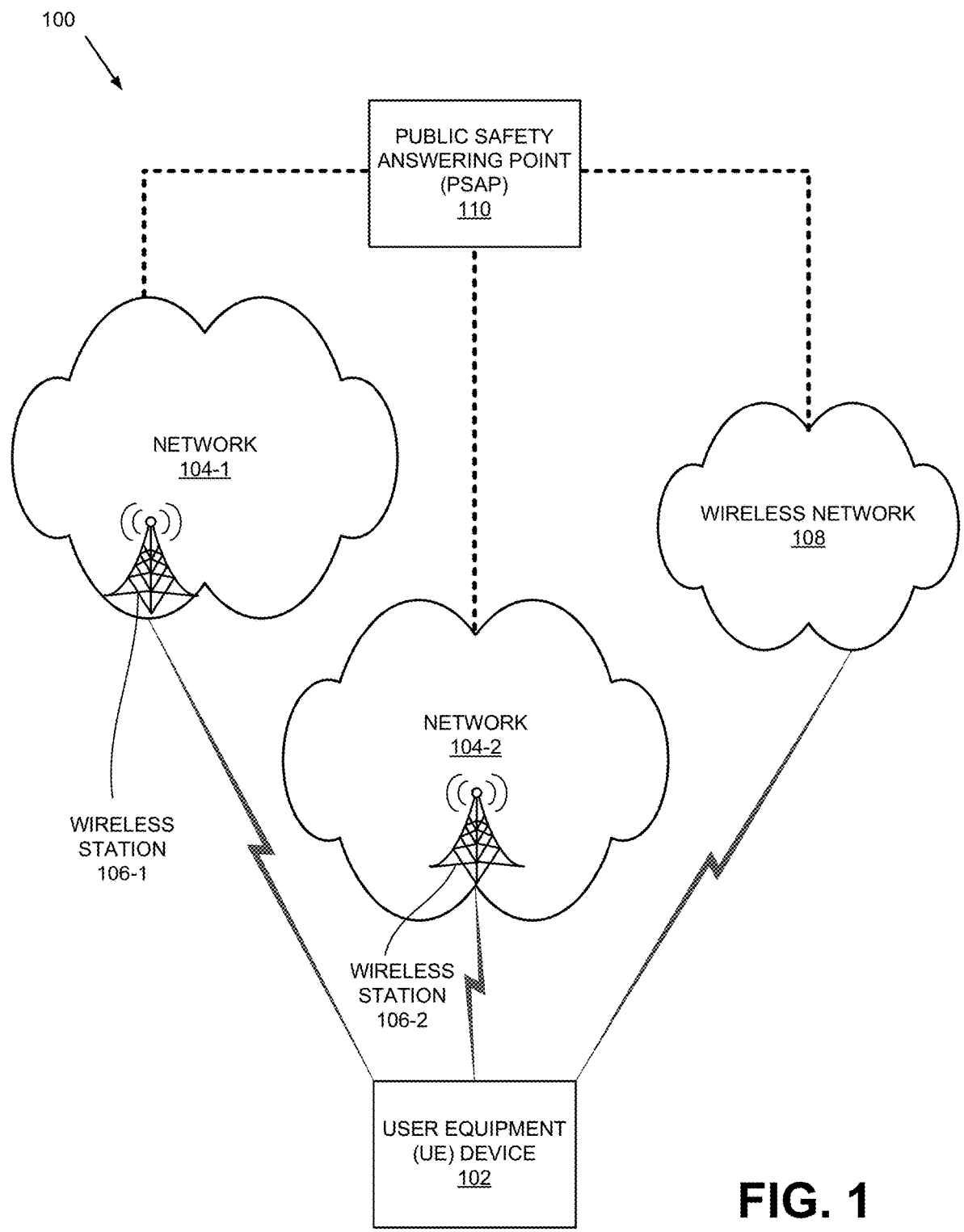
FIG. 1 illustrates an exemplary network environment in which the concepts described herein may be implemented.

FIG. 1 illustrates an exemplary network environment 100 in which the concepts described herein may be implemented. As shown, network environment 100 may include UE device 102, networks 104-1 and 104-2, a wireless network 108, and a Public Safety Answering Point (PSAP) 110.

UE device 102 may include a wireless communication device. Examples of UE device 102 include: a smart phone; a tablet device; a wearable computer device (e.g., a smart watch); a global positioning system (GPS) device; a laptop computer; a media playing device; a portable gaming system; an Internet-of-Things (IoT) device; etc. In some implementations, UE device 102 may correspond to a wireless MTC device that communicates with other devices over a machine-to-machine (M2M) interface, such as LTE-M or Category M1 (CAT-M1) devices and Narrow Band (NB)-IoT devices.

Networks 104-1 and 104-2 (collectively referred to as networks 104 and generically as network 104) may include a local area network (LAN), a wireless LAN, a wide area network (WAN), a metropolitan area network (MAN), an optical network, a cable television network, a satellite network, a wireless network (e.g., a CDMA network, a general packet radio service (GPRS) network, an LTE network (e.g., 4G network), a 5G network, an ad hoc network, a telephone network (e.g., the Public Switched Telephone Network (PSTN) or a cellular network), an intranet, or a combination of networks. Network 104 may allow the delivery of Internet Protocol (IP) services to UE device 102 and may interface with and/or include other networks, such as a packet data network.

In some implementation, networks 104-1, 104-2, and 108 may include a 5G network, a 4G network, and a WLAN 108, respectively. In such implementations, 5G network 104-1 may provide an Assisted Global Positioning System (A-GPS) positioning service; a Wi-Fi positioning service or an E-Cell ID (E-CID) positioning service. 5G Network 104-1 may or may not provide Observed Time Difference of Arrival (OTDOA)-based positioning service (e.g., multilateration-based positioning service).

As shown in FIG. 1, 5G Network 104-1 may include at least one wireless station 106-1. An example of wireless station 106-1 includes 5G Node B (gNodeB). Wireless station 106-1 may be part of an access network (e.g., a New Radio (NR) access network). The access network may provide UE device 102 with wireless access to 5G network 104-1.

4G network 104-2 may provide an A-GPS positioning service, Wi-Fi positioning service, E-CID positioning service, and OTDOA positioning service. As shown in FIG. 1, 4G network 104-2 may include at least one wireless station 106-2. An example of wireless station 106-2 includes Evolved Node B (eNodeB). Wireless station 106-2 may be part of an access network (e.g., an evolved UMTS Terrestrial Radio Access Network (eUTRAN)). The access network may provide UE device 102 with wireless access to 4G network 104-2.

Although illustrated as separate networks, in some implementations, 5G network 104-1 and 4G network 104-2 may be part of a single provider network. In such an implementation, some components of network 104-1 may also be components of network 104-2.

Wireless network 108 may include a wireless LAN (e.g., Wi-Fi, etc.). PSAP 110 may include a call center for answering calls to emergency telephone number (e.g., for police, firefighting, ambulance service, etc.).

In FIG. 1, UE device 102 may select network 104-1 as the primary network for placing emergency calls, depending on whether network 104-1 provides a superior positioning service over those of network 104-2 and wireless network 108. For example, assume that network 104-1 and network 104-2 are implemented as a 5G network and a 4G network, respectively, as discussed above. If 5G network 104-1 does not provide a superior OTDOA service than 4G network 104-2 and wireless network 108 (e.g., 4G OTDOA positioning service, E-CID-based positioning service, A-GPS positioning service, Wi-Fi positioning service, etc.), then UE device 102 may designate network 104-2 as the primary network for placing the emergency call. Thereafter, UE device 102 may perform actions, which are discussed below with reference to FIG. 5, that are part of the process 500 for making an emergency call. If 5G network 104-1 offers a superior positioning service than 4G network 104-2, then UE device 102 may perform actions, which are discussed below with reference to FIG. 8, that are part of process 800, for making the emergency call. In some implementations, networks 104-1 and 104-2 may allow UE device 102 to select the primary network based on location services by indicating, during UE device 102's attachment procedure, whether network 104 supports emergency call and/or emergency call service fallback.

Depending on the implementation, network environment 100 may include networks other than those illustrated in FIG. 1. Furthermore, for simplicity, FIG. 1 does not show all components that may be included in network environment 100 (e.g., routers, bridges, wireless access point, additional UE devices, additional wireless stations, additional PSAPs, etc.).

Figure 2:
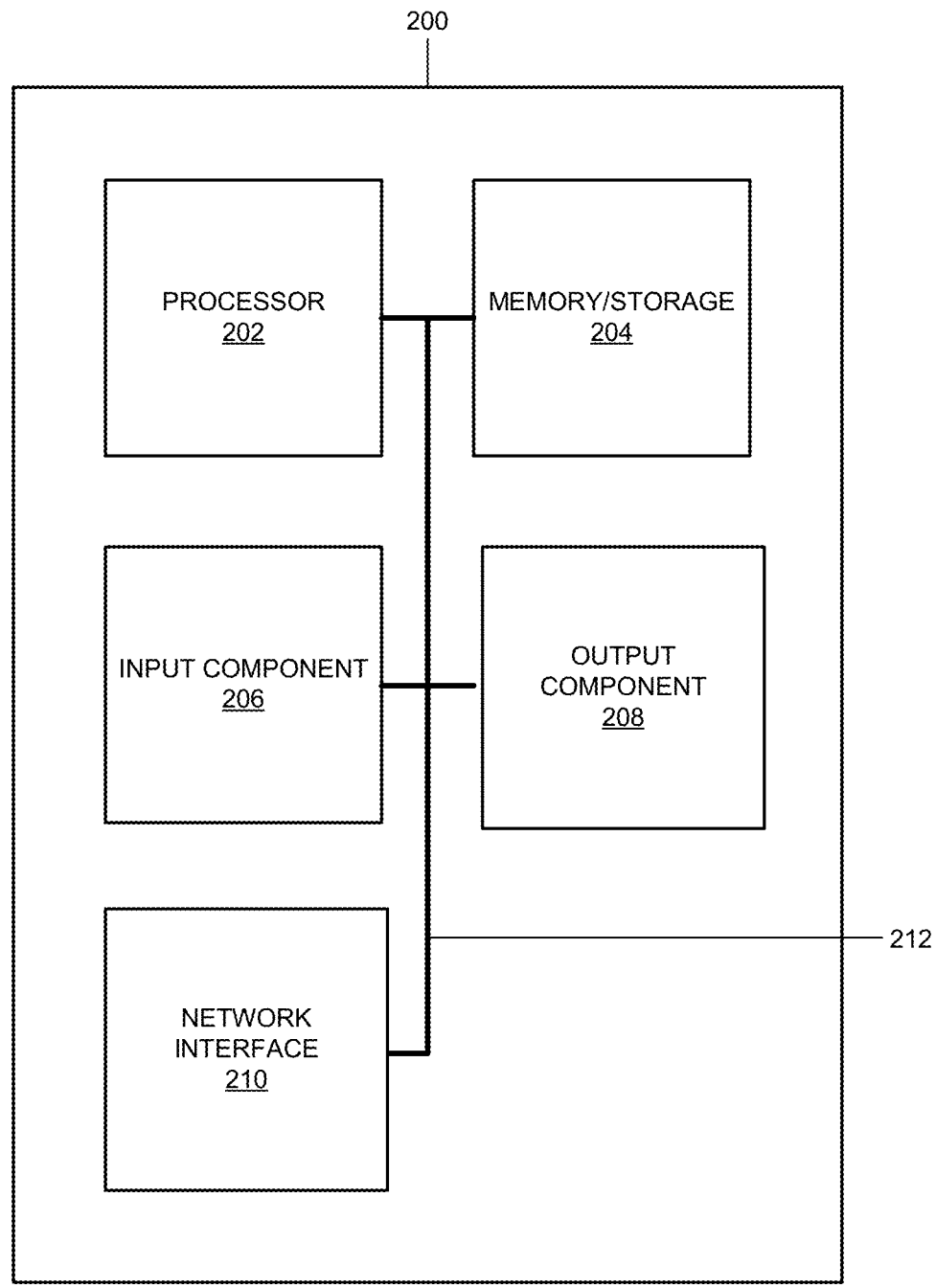
FIG. 2 illustrates exemplary components of network devices included in the network environment of FIG. 1.

FIG. 2 is a block diagram of exemplary components of a network device 200. Network device 200 may correspond to, or be included in, the devices and/or components of the networks depicted in FIG. 1 (e.g., UE device 102, wireless station 106, a router, a switch, a server, etc.). As shown, network device 200 may include a processor 202, memory/storage 204, input component 206, output component 208, network interface 210, and communication path 212. In different implementations, network device 200 may include additional, fewer, different, or a different arrangement of components than the ones illustrated in FIG. 2. For example, network device 200 may include line cards, modems, etc.

Processor 202 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling device 200 and/or executing programs/instructions.

Memory/storage 204 may include static memory, such as read only memory (ROM), and/or dynamic memory, such as random access memory (RAM), or onboard cache, for storing data and machine-readable instructions (e.g., programs, scripts, etc.).

Memory/storage 204 may also include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 204 may be external to and/or removable from network device 200. Memory/storage 204 may include, for example, a Universal Serial Bus (USB) memory stick, a dongle, a hard disk, off-line storage, a Blu-Ray® disk (BD), etc. Memory/storage 204 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 206 and output component 208 may receive input from a user and provide output to a user. Input/output components 206 and 208 may include, for example, a display screen, a keyboard, a mouse, a speaker, a microphone, a camera, a DVD reader, USB lines, and/or other types of components.

Network interface 210 may include a transceiver (e.g., a transmitter and a receiver) for network device 200 to communicate with other devices and/or systems. For example, via network interface 210, network device 200 may communicate over a network, such as the Internet, an intranet, a terrestrial wireless network (e.g., a WLAN, WiFi, WiMax, etc.), a satellite-based network, optical network, etc. Network interface 210 may include a modem, an Ethernet interface to a LAN, and/or an interface/connection for connecting device 300 to other devices (e.g., a Bluetooth interface).

Communication path 212 may provide an interface (e.g., a bus) through which components of device 200 can communicate with one another.

In some implementations, network device 200 may perform the operations described herein in response to processor 202 executing software instructions stored in a non-transient computer-readable medium, such as memory/storage 204. The software instructions may be read into memory/storage 204 from another computer-readable medium or from another device via network interface 210. The software instructions stored in memory/storage 204, when executed by processor 202, may cause processor 202 to perform processes that are described herein. In other implementations, the instructions may be hard coded. For example, when network device 200 is implemented as UE device 102, UE device 102 may perform automatic dialing of emergency call number (e.g., 911 in the U.S.).

Figure 3:
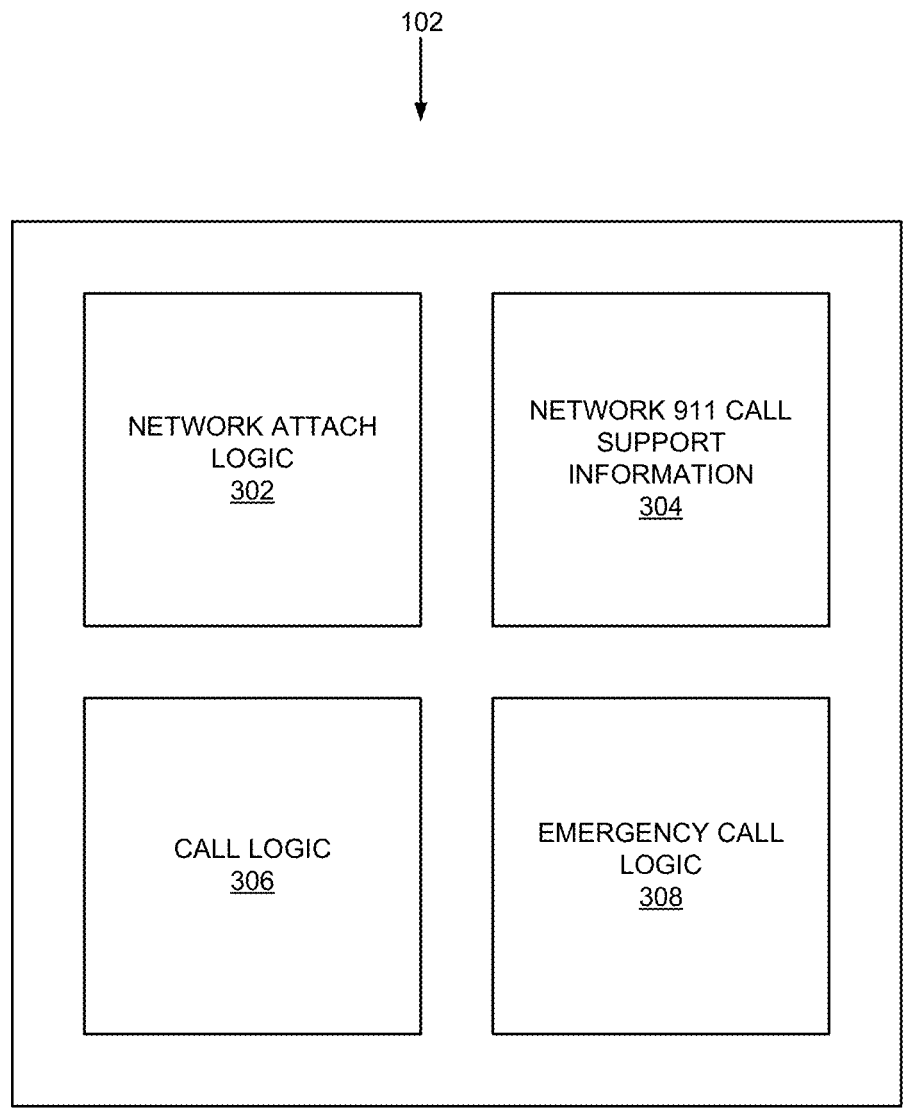
FIG. 3 shows exemplary functional components of the user equipment (UE) device of FIG. 1.

FIG. 3 illustrates exemplary functional components of UE device 102. As shown, UE device 102 may include network attach logic 302, network call support information logic 304, call logic 306, and emergency call logic 308. Depending on the implementations, UE device 102 may include additional, fewer, or different components than those shown in FIG. 3. Also, although not shown, UE device 102 may include other functional components, such as browsers, an operating system, etc.

Network attach logic 302 may attach UE device 102 to network 104 and register UE device 102 with network 104. Attaching UE device 104 to network 104 (or another network) may entail exchanging a series of messages with network 104, including those required for authentication.

Network call support information logic 304 may obtain network related information either during or after the attachment process. For example, network call support information logic 304 may obtain, from network 104, a list of positioning services and store the list in a local drive (or another form of storage). For example, assume that UE device 102 is attaching to network 104-1. Network call support information logic 304 may determine that network 104-1 offers A-GPS, E-CID, Wi-Fi, but not OTDOA positioning service. In addition, network call support information logic 304 may determine whether network 104-1 supports emergency call service and/or emergency call service fallback.

Call logic 306 may include one or more programs or instructions for making calls. For example, a user of UE device 102 may select or input a particular phone number and make a call via call logic 306. In addition, call logic 306 may use emergency call logic 308 to make an emergency call based on user input (e.g., voice activated or GUI-triggered input). Emergency call logic 308 may perform actions required for placing emergency calls with particular networks.

Figure 4:
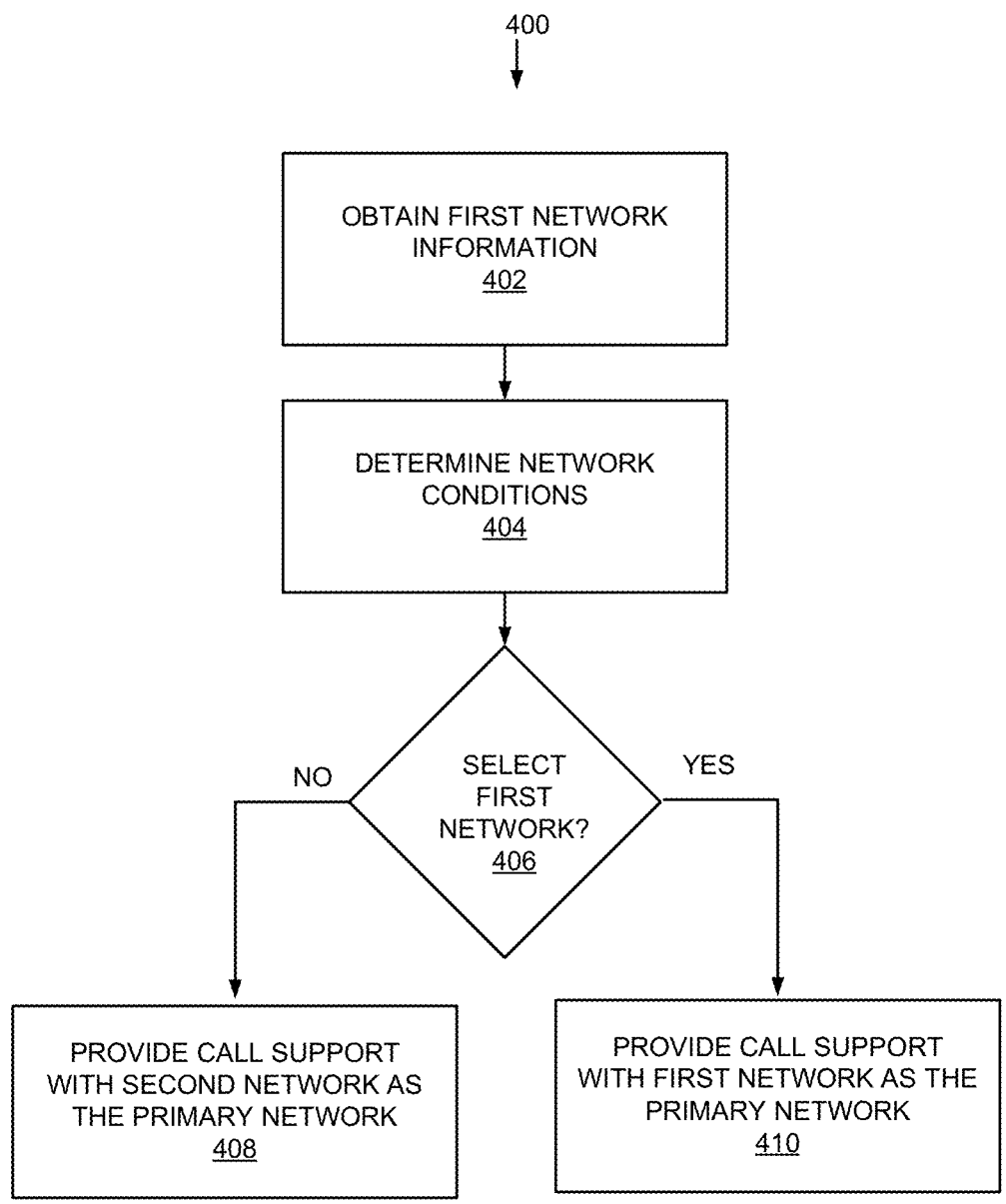
FIG. 4 illustrates an exemplary process for providing emergency call support using multiple radio access technologies (RATs)

When processor 202 in UE device 102 executes computer instructions that are associated with network attach logic 302, network call support information logic 304, call logic 306, and emergency call logic 308, UE device 102 may perform a process for providing emergency call support over different networks, which may employ different radio access technologies (RATs). FIG. 4 illustrates the process 400.

As shown in FIG. 4, process 400 may include obtaining network information about network emergency call service support, emergency call service fallback support, positioning services and network conditions (block 402). For example, assume that UE device 102 communicates with networks 104 and wireless network 108. During or after an attachment procedure with networks 104, UE device 102 may obtain information pertaining to whether network 104-1 supports emergency call service and/or emergency call service fallback and a list of positioning services offered or supported by network 104-1 and store the information.

Process 400 may further include determining network conditions (block 404). For example, UE device 102 may obtain and store information on networks 104-1 and 104-2. For each network 104, the information may indicate whether the network supports emergency call service and/or emergency call service fallback. The information may also include key performance indicators (e.g., traffic, bandwidths, jitter, call drop rates, signal to noise ratios, etc.) that are relevant to determining the likelihood of completing an emergency call over the network.

Depending on the implementation, UE device 102 may obtain the information in various ways. For example, in one implementation, UE device 102 may query network 104 for some of the information. In another example, UE device 102 may obtain some of the information from its components (e.g., signal power). In yet another example, UE device 102 may obtain the information from network 104 during the attachment procedure.

Based on the obtained information, UE device 102 may determine whether to select network 104-1 as the primary network over which UE device 102 will make an emergency call (block 406). Depending on the implementation, UE device 102 may place different degrees of importance to the availability of a highly precise positioning service and other network conditions. For example, assume that network 104-1 is a 5G network. In one implementation, UE device 102 may designate network 104-1 as the primary network, because network 104-1 indicated that it supports emergency call service or that it supports emergency call service but not emergency call service fallback. In a different implementation, UE device 102 may designate network 104-1 as the primary network, because network 104-1 provides an OTDOA-based positioning service. In yet another implementation, UE device 102 may select network 104-1 over network 104-2 even though network 104-1 does not provide an OTDOA-based positioning service, because the call drop rate of network 104-2 is extremely high. In still yet another implementation, UE device 102 may designate network 104-2 as the primary network because, during the attachment, network 104-1 indicated that it supports emergency call service fallback but not emergency service.

At block 406, if UE device 102 does not select network 104-1 as the primary network for making an emergency call (block 406: NO), UE device 102 provides call support with network 104-2 selected as the primary network (block 408). Otherwise (block 406: YES), UE device 102 provides call support with network 104-1 selected as the primary network (block 410).

Figure 5:
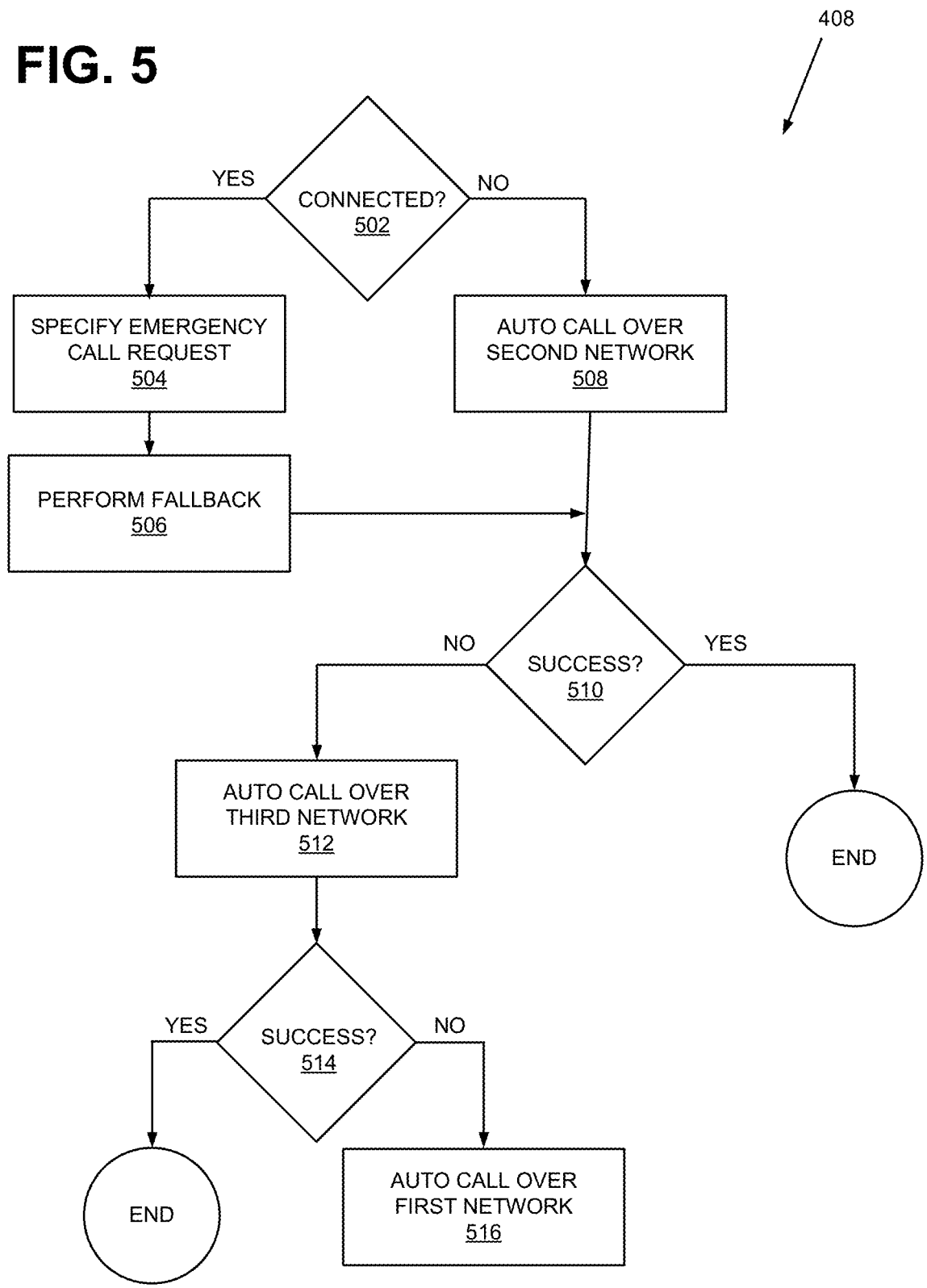
FIG. 5 illustrates an exemplary process associated with providing emergency call support when one network of FIG. 1 is selected as a primary network by the UE device.

FIG. 5 illustrates an exemplary process 500 that is associated with block 408 of FIG. 4. Process 500 begins with UE device 102 determining whether UE device 102 is in a connected state with respect to the primary network (block 502).

Figure 6:
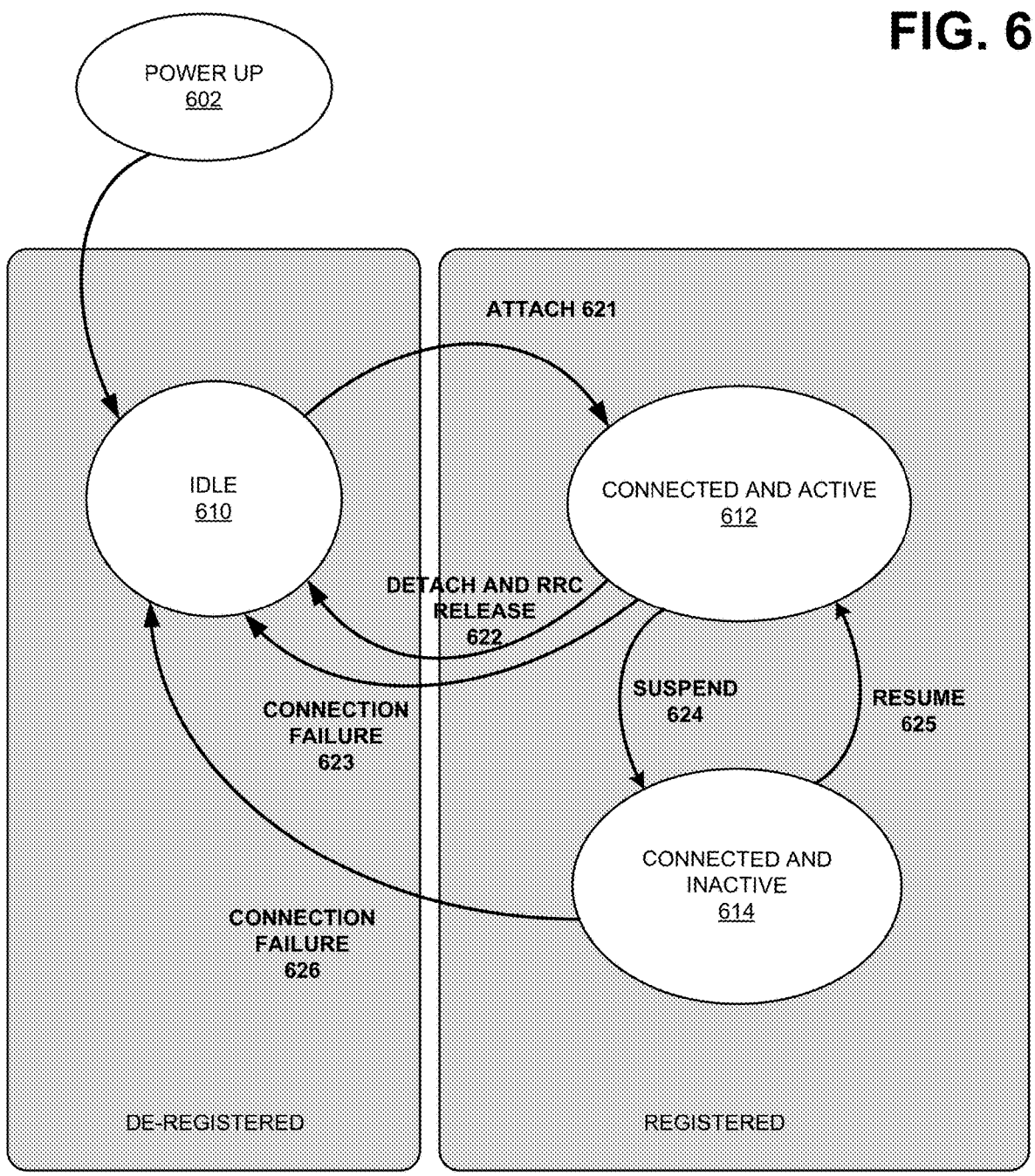
FIG. 6 illustrates a state transition diagram that is associated with the UE device and a network of FIG. 1.

A connected state is one of many possible states that UE device 102 may be in during its operation. The possible states are shown in FIG. 6, which is a state transition diagram associated with UE device 102 and network 104. As shown, UE device 102 can be in one of the following states: POWER UP 602, IDLE 610, CONNECTED AND ACTIVE 612, and CONNECTED AND INACTIVE 614.

When UE device 102 is powered on, UE device 102 is in POWER UP state 602. UE device 102 then transitions into IDLE state 610, at which UE device 102 detects signals from a wireless station of network 104 and makes an attempt to attach 621 to network 104. If UE device 102 fails to attach (Connection Failure 623) to network 104, UE device 102 returns to or remains in IDLE state 610. Otherwise, UE device 102 transitions to CONNECTED AND ACTIVE state 612.

At CONNECTED AND ACTIVE state 612, UE device 102 may suspend 624 its connection activity (e.g., the user has not touched UE device 102 for a certain amount of time) and enter into CONNECTED AND INACTIVE state 614. UE device 102 may leave state 614 when UE device 102 resumes 625 its activity (e.g., the user has tapped on the display screen of UE device 102). Alternatively, at state 614, if there is a connection failure 626, UE device 102 may return to IDLE state 610.

In FIG. 6, when UE device 102 is in IDLE state 610, UE device 102 is de-registered with respect to network 104. When UE device 102 is in CONNECTED AND ACTIVE state 612 or CONNECTED AND INACTIVE state 614, UE device 102 is registered with network 104.

Figure 7:
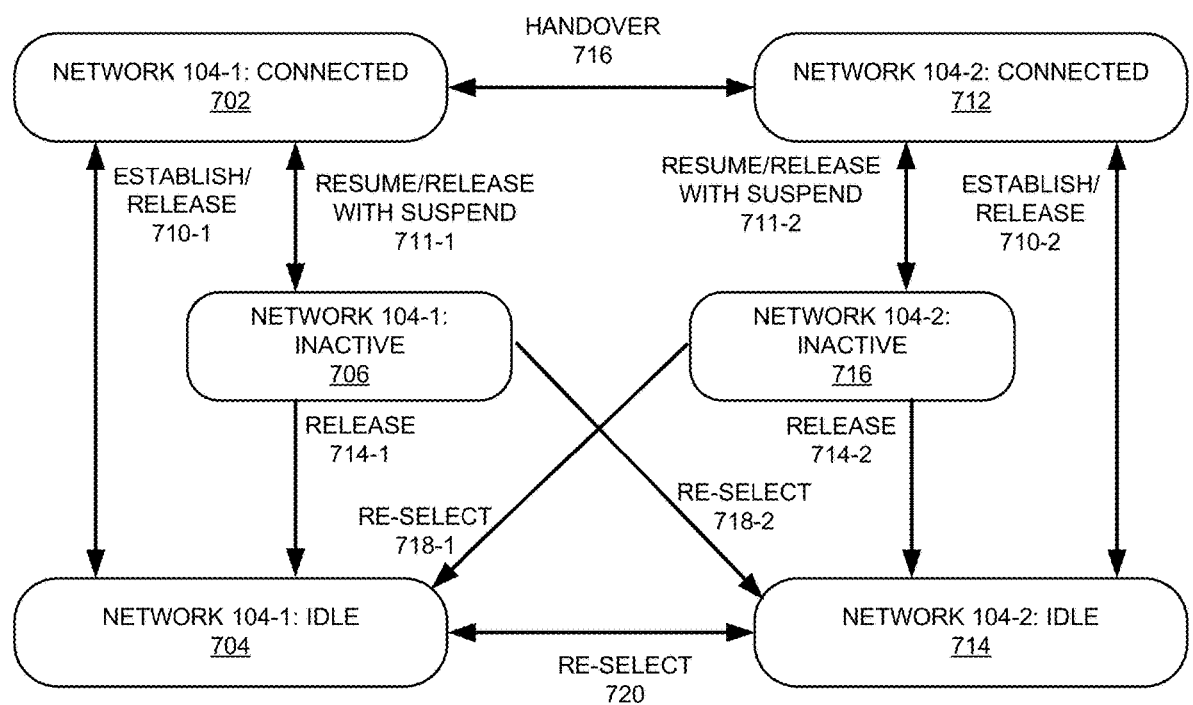
FIG. 7 illustrates a state transition diagram that is associated with the UE device and two wireless networks of FIG. 1.

FIG. 7 illustrates a state transition diagram that is associated with UE device 102 and two networks 104-1 and 104-2. UE device 102 may make state transitions in accordance with FIG. 7 when UE device 102 interacts with networks 104-1 and 104-2. In FIG. 7, UE device 102 is not simultaneously connected to both networks 104-1 and 104-2, although it may have the capability to do so.

As shown, with respect to network 104-1, UE device 102 may be in CONNECTED state 702. UE device 102 may have arrived at CONNECTED state 702 from IDLE state 704 (by establishing a connection 710-1) or from CONNECTED AND INACTIVE state 706 (by resuming 711-1). UE device 102 may transition into IDLE state 704 from CONNECTED state 702 (by release 710-1) or from INACTIVE state 706 (by release 714-1). From CONNECTED state 702, UE device 102 may transition into INACTIVE state 706.

With respect to network 104-2, UE device 102 may be in CONNECTED state 712. UE device 102 may have arrived at CONNECTED state 712 from IDLE state 714 (by establishing a connection 710-2) or from CONNECTED AND INACTIVE state 716 (by resuming 711-2). UE device 102 may transition into IDLE state 714 from CONNECTED state 712 (by release 710-2) or from INACTIVE state 716 (by release 714-2). From CONNECTED state 712, UE device 102 may transition into INACTIVE state 716.

Comparing FIG. 6 to FIG. 7, it is clear that states 702-706 and states 712-716 correspond to the states illustrated in FIG. 6 but applied to two networks 104 instead of one network. However, FIG. 7 also shows at which states UE device 102 may transition from one state with regard to network 104-1 to another state with respect to network 104-2. Transitions between CONNECTED state 702 (with respect to network 104-1) and CONNECTED state 712 can occur through handover 726; and transitions between IDLE state 704 (with respect to network 104-1) and IDLE state 714-2 can occur through UE device 102 re-selecting its access network. In addition, if UE device 102 is in INACTIVE state 706 or 716 with respect to one network 104, UE device 102 may enter into IDLE state 704 or 714 with respect to the other network 104.

Returning to FIG. 5, at block 502, if UE device 102 is in the CONNECTED state 702 with respect to network 104-1, UE device 102 sends an emergency call request message (block 504). In the message, UE device 102 specifies the type of request. Because at block 406, UE device 102 selected network 104-2 as the primary network, UE device 102 sets the request type to emergency fallback. In response to the request, network 104-1 attempts a fallback emergency call over network 104-2 (block 506). The fallback call involves initiating a handover or redirect from network 104-1 to network 104-2. As shown in FIG. 7, in this maneuver, UE device 102 transitions from CONNECTED state 702 to CONNECTED state 712.

If a handover occurs in the above, two sub-handovers may occur: an inter-RAT handover of UE device 102 from wireless station 106-1 to wireless station 106-2, as described below with reference to FIG. 10; and an inter-system handover of UE device 102 from network 104-1 to network 104-2, as described below with reference to FIG. 9 and FIG. 10. From block 506, after the handover, network 104-2 attempts to establish an emergency call session between UE device 102 and PSAP 110. Network 104-2 provides location information to either UE device 102 or to PSAP 110. Process 500 then proceeds to block 510.

Returning to block 502, if UE device 102 is not in CONNECTED state 702 (block 502: NO), UE device 102 makes an automatic fallback emergency call over network 104-2 (block 508). Because UE device 102 is not connected to network 104-1, there is no need for a handover or. Instead, UE device 102 connects to and registers with network 104-2. Network 104-2 and UE device 102 interact with one another in placing an emergency call to PSAP 110, with network 104-2 providing location information to either UE device 102 or PSAP 110. Process 500 then proceeds to block 510.

At block 510, UE device determines whether UE device 102 was able to make the emergency call (block 510). If UE device 102 successfully made the call (block 510: YES), process 500 terminates. Otherwise (block 510: NO), UE device 102 proceeds to make a call over wireless network 108 (block 512). At block 512, wireless network 108 provides location information to UE device 102 or to PSAP 110.

At block 514, UE device 102 determines whether the call over network 108 was a success. If so (block 514: YES), process 500 terminates. Otherwise (block 514: NO), UE device 102 makes an emergency call over network 104-1 (block 516). At block 516, UE device 102 makes a state transition from IDLE state 714 to IDLE state 704 through reselection 720, and then to CONNECTED state 702, by re-establishing a connection with network 104-1. UE device then makes the emergency call request to network 104-1. The request type is set to emergency support without fallback. In response, network 104-1 connects UE device 102 to PSAP 110, providing location information to UE device 102 or to PSAP 110.

Figure 8:
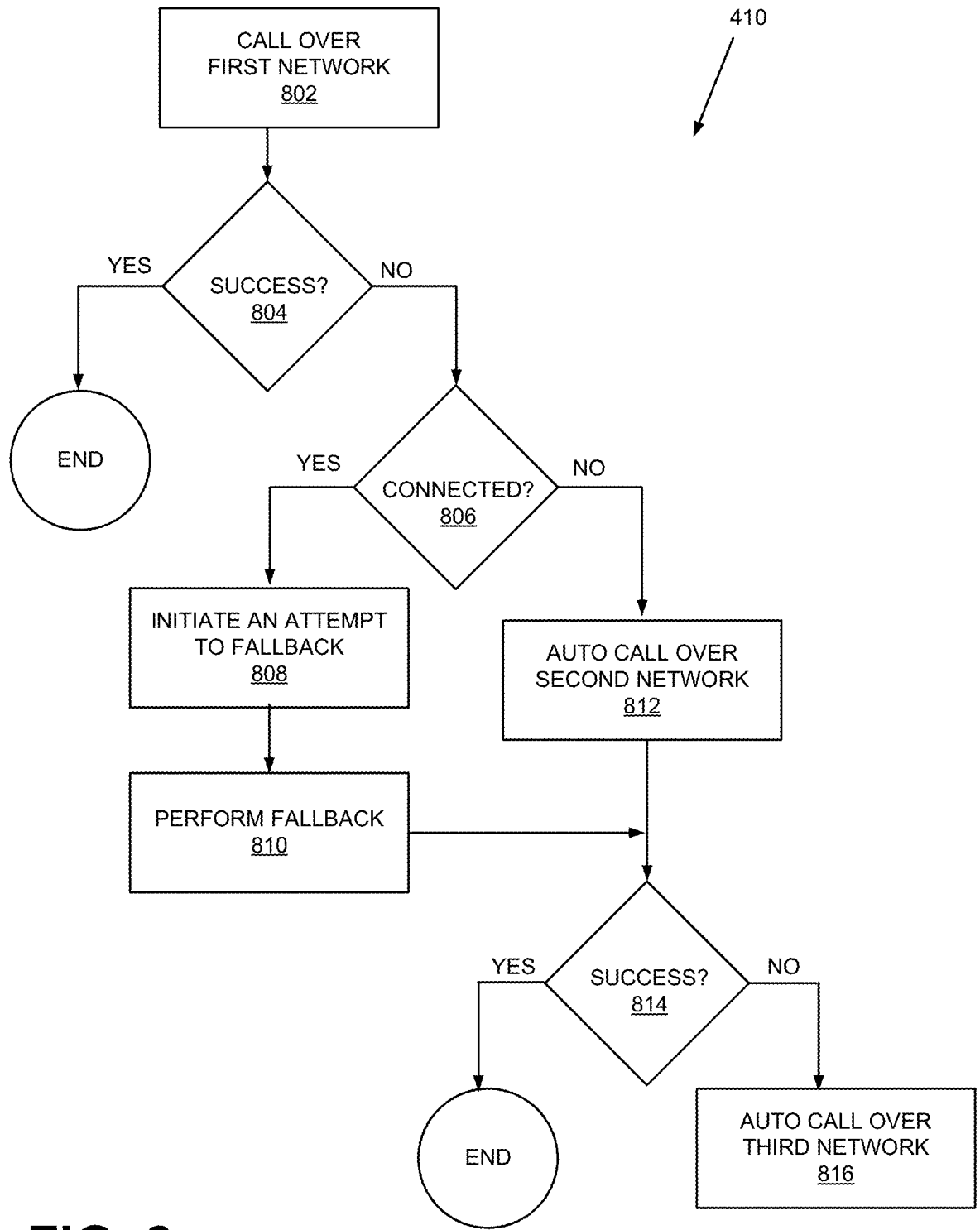
FIG. 8 illustrates an exemplary process associated with providing emergency call support when another network of FIG. 1 is selected as the primary network by the UE device.

FIG. 8 illustrates an exemplary process 800 that is associated with block 410 of FIG. 4. Process 800 may be performed by UE device 102, networks 104, and wireless network 108.

Process 800 begins with UE device 102 making a call over network 104-1 (block 802). Because UE device 102 is already in CONNECTED state 702, UE device 102 sends an emergency call request message. In the message, UE device 102 sets the request type to emergency support and emergency fallback support. In response to the request from UE device 102, network 104-1 attempts place a call to PSAP 110 (block 802). Network 104-1 provides location information to either UE device 102 or to PSAP 110.

At block 804, UE device 102 determines whether the call was successfully made. If so, process 800 terminates. Otherwise (block 804: NO), UE device 102 initiates an attempt to use other networks to make an emergency call. UE device 102 begins the attempt by determining whether it is still in CONNECTED state 702 (block 806).

If UE device 102 is still in CONNECTED state 702 (block 806: YES), UE device re-attempts to make a fallback emergency call via over network 104-2 (block 808). UE device 102 initiates the attempt by sending an emergency call request message to network 104-1, but this time, setting the request type to no emergency support and emergency fallback support. In response to the request, network 104-1 performs a fallback procedure (block 810), similarly as described above with respect to block 508. As discussed above, a fallback call involves directing or initiating a handover from network 104-1 to network 104-2. As shown in FIG. 7, for the handover, UE device 102 transitions from CONNECTED state 702 to CONNECTED state 712. Also, as similarly as previously discussed, the handover entails two sub handovers: an inter-RAT handover of UE device 102 from wireless station 106-1 to wireless station 106-2, as described below with reference to FIG. 10; and an inter-system handover of UE device 102 from network 104-1 to network 104-2, as described below with reference to FIG. 9 and FIG. 10. After the handover, network 104-2 connects UE device 102 to PSAP 110. Network 104-2 provides location information to either UE device 102 or to PSAP 110. Process 800 then proceeds block 814.

Returning to block 806, if UE device 102 is not in CONNECTED state 702 (block 806: NO), UE device 102 initiates an automatic fallback call over network 104-2 (block 812), given that network 104-1 has failed to support an emergency call at block 802. The fallback call entails connecting and registering with network 104-2, since UE device 102 has been connected only to network 104-1 and not to network 104-2. Network 104-2 connects UE device 102 to PSAP 110. Network 104-2 provides location information UE device 102 or to PSAP 110. Process 500 then proceeds to block 814.

At block 814, UE device 102 determines whether UE device 102 was able to make the fallback emergency call. If UE device 102 successfully made the call (block 814: YES), process 800 terminates. Otherwise (block 814: NO), UE device 102 proceeds to make an emergency call over wireless network 108 (block 816). Wireless network 108 provides location information to UE device 102 or to PSAP 110.

Figure 9:
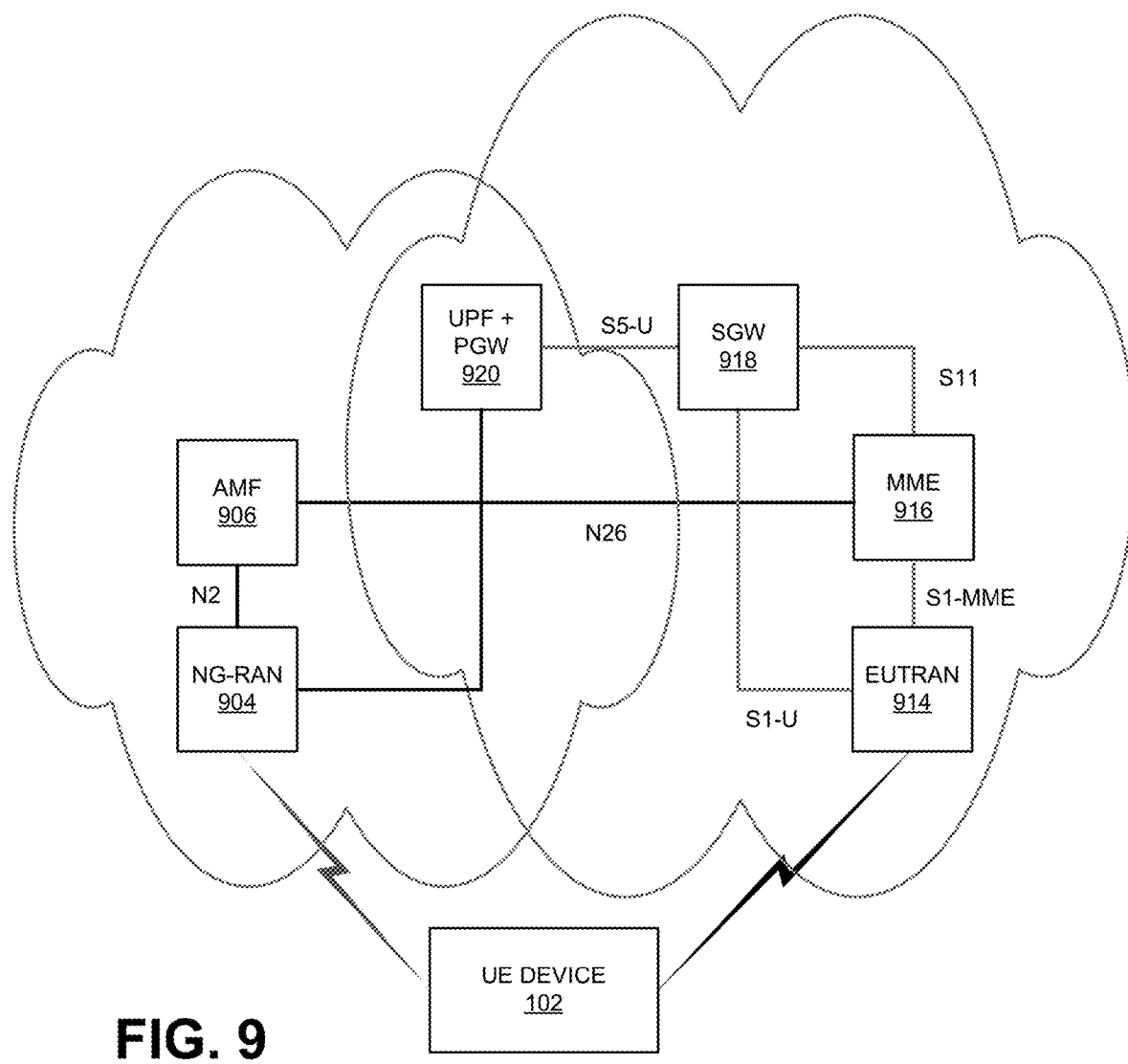
FIG. 9 illustrates functional components of networks of FIG. 1.

FIG. 9 illustrates functional components of networks 104 according to an exemplary implementation. In this implementation, network 104-1 is a 5G core network, and network 104-2 is a 4G core network (e.g., evolved packet core (EPC) or evolved packet system (EPS)). Both networks 104 are part of a provider network and may share common network elements. For example, network 104-1 includes User Plane Function (UPF) 920 and network 104-2 includes a Packet data network Gateway (PGW) 920. Both UPF 920 and PGW 920 may occupy the same physical device or a software module.

As shown, network 104-1 includes NG-RAN 904, Access and Mobility Function (AMF) 906, and User Plane Function (UPF) 920. Network 104-2 includes eUTRAN 914, Mobility Management Entity (MME) 916, Serving Gateway (SGW) 918, and Packet data network Gateway (PGW) 920. Although networks 104-1 and 104-2 have additional network nodes and/or functions that interact with one another via different interfaces, they are not illustrated in FIG. 9 for simplicity.

NG-RAN 904 may provide access to network 104-1, to wireless devices, such as UE device 102. As discussed above, NG-RAN 904 is part of an access network, with one or more wireless stations.

AMF 906 may perform registration management, connection management, reachability management, mobility management, lawful intercepts, Short Message Service (SMS) transport between UE device 102 and other 5G core functions (not shown in FIG. 9), access authentication and authorization, positioning services management, management of non-3GPP access networks, and/or other types of management processes. NG-RAN 904 may interact with AMF 906 via an N2 interface.

UPF node 908 may maintain an anchor point for intra/inter-Radio Access Technology (RAT) mobility, maintain an external packet data unit (PDU) point of interconnect to a data network, perform packet routing and forwarding, perform the user plane part of policy rule enforcement, perform packet inspection, perform lawful intercept, perform traffic usage reporting, perform Quality of Service (QoS) handling in the user plane, perform uplink traffic verification, perform transport level packet marking, perform downlink packet buffering, send and forward an "end marker" to a radio access network node (e.g., gNodeB), and/or perform other types of user plane processes. UPF 908 may communicate with NG-RAN 904 and other functions/components using an N3 and other interfaces.

eUTRAN 914 may provide access to network 104-2, to wireless devices, such as UE device 102. As discussed above, eUTRAN 914 is part of an access network, with one or more wireless stations.

MME 916 may provide control plane processing for an evolved packet core (EPC) in network 104-2. For example, MME 916 may implement tracking and paging procedures for UE device 102, may activate and deactivate bearers for UE device 102, may authenticate a user of UE device 102 and may interface to non-LTE radio access networks. A bearer may represent a logical channel with particular QoS requirements. MME 916 may also select a particular SGW for a particular UE device 102. MME 916 may communicate with wireless station 106-2 through an S1-U interface.

SGW 918 may provide an access point to UE device 102, handle forwarding of data packets for UE device 102, perform transport level markings (e.g., QoS Class Identifier (QCI)), and act as a local anchor point during handover procedures between wireless stations. In addition, SGW 918 may forward messages between MME 916 and PGW 920. For example, when SGW 918 receives a message from MME 016 indicating that UE device 102 is unavailable to accommodate a request to change the bearer, SGW 918 may forward the message to PGW 920. SGW 918 may interact with eUTRAN 914, MME 916, and PGW 920 over an S1-U interface, an S11 interface, and S5-U interface, respectively.

PGW 920 may function as a gateway to packet data network (not shown). In addition, when UE device 102 attaches to network 104-2 (through eUTRAN 914), PGW 920 may allocate an IP address for UE device 102. Additionally, when PGW 920 receives a message from a Policy and Charging Rules Function (PCRF) to modify a QoS for UE device 102, PGW 920 may dispatch a message to MME 916 (via SGW 918) to change the bearer for UE device 102.

PGW 920 may function as a gateway to a packet data network. PGW 920 may allocate an IP address for UE device 920. Furthermore, when PGW 020 receives a message from a Policy and Charging Rules Function (PCRF) to modify a QoS for UE device 102, PGW 226 may change the bearer for UE device 102.

In FIG. 9, when UE device 102 is handed off from NG-RAN 904 to eUTRAN 914, AMF 906 communicates with MME 916 to provide MME 916 with information about UE device 102 (e.g., bearer information) over an N26 interface. The inter-system communication between AMF 906 and MME 916 allows networks 104 from having to change bearers or having to go through the process of recycling network resources already allocated for UE device 102 at network 104-1.

Figure 10:
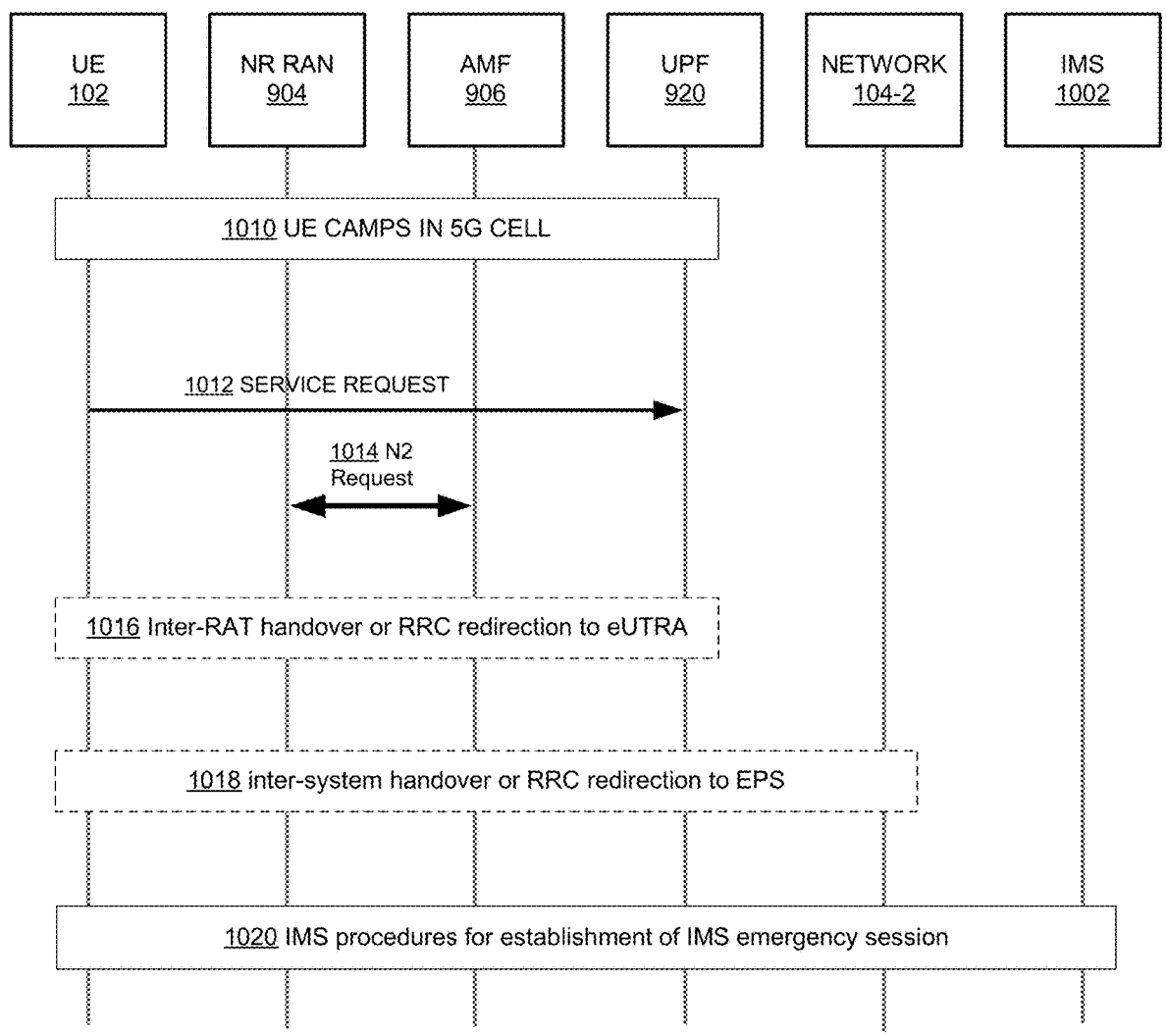
FIG. 10 illustrates exemplary communications between the UE device and different components of networks during an exemplary emergency call fallback.

FIG. 10 illustrates exemplary communications between UE device 102, components of network 104-1, and network 104-2 during an emergency call fallback (e.g., blocks 504 and 506 of FIG. 5 and blocks 808 and 810 of FIG. 8). FIG. 10 shows an IP Multimedia Subsystem (IMS) 1002, which provides voice and multimedia services to UE device 102 based on Session Initiation Protocol (SIP).

As shown, UE device 102 camps in a 4G/5G cell (1010). Assume that while UE device 102 is in CONNECTED state 702, the user of UE device 102 makes an emergency call. In response to user input, UE device 102 sends a service request associated with the call (1012). The message is relayed to UPF 920, which becomes aware of the UE device 102's request. NG-RAN 904 then interacts with AMF 906 over the N2 interface (1014). Subsequently, components of network 104-1 perform network 104-1-side related logistics for an inter-RAT handoff from wireless station 106-1 to wireless station 106-2 (1016).

At 1018, the components of network 104-1 (e.g., NG RAN 904, AMF 906, and UPF 920) take steps that are associated with the handoff, and AMF 906 forwards UE device 102-related information to MME 916, allowing network 104-2 to handle the handoff. In some implementations, specific AMFs 906 correspond to specific MMES 916, and therefore, AMF 906 knows to which MME 916 it has to send messages relating to 5G-to-4G handoffs.

Once the handoff from network 104-1 to network 104-2 is complete, UE device 102 may interact with IMS 1002. IMS 1002 and UE device 102 may follow procedures for establishment of IMS emergency session, including providing the location of UE device 102 to PSAP 110 through the location service provided by network 104-2.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while a series of blocks have been described with regard to the processes illustrated in FIGS. 4, 5 and 8, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

"To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information."

No element, block, or instruction used in the present application should be construed as essential to the implementations described herein unless explicitly described as such. As used herein, the articles "a," "an," and "the" are intended to include one or more items. The phrase "based on" is intended to mean "based, at least in part, on" unless explicitly stated otherwise.

What is claimed is:

1. A device comprising:
    an interface to wirelessly communicate with a first wireless network and a second wireless network;
    a memory device to store a set of processor-executable instructions; and
    a processor configured to execute the processor-executable instructions, wherein executing the processor-executable instructions causes the processor to:
        connect to the first wireless network;
        determine whether the first wireless network provides a particular service for determining a position of the device more accurately than a location service provided by the second wireless network, whether the first wireless network provides an emergency call service, and whether the first network provides an emergency call service fallback;
        select the first wireless network as a primary network if the first wireless network provides the emergency call service and the particular service;
        select the second wireless network as the primary network if the first wireless network does not provide the emergency call service or the particular service;
        if the processor selects the first wireless network as the primary network, send a first request to the first wireless network to make an emergency call from the device to an endpoint over the first wireless network; and
        if the processor selects the second wireless network as the primary network, perform a fallback emergency call procedure using the second wireless network to connect the device to the endpoint,
    wherein when the processor sends the first request to the first wireless network, the processor is further to:
        after the first wireless network attempts to place the emergency call in response to the first request, determine whether the emergency call is successfully placed over the first wireless network; and
        if the emergency call is not successfully placed,
            determine whether the device is still connected to the first wireless network,
            if the device is still connected to the first wireless network,
                send a second request to the first wireless network to hand off or redirect the device from the first wireless network to the second wireless network, and
                place the emergency call to the endpoint over the second wireless network after the device is handed off or redirected from the first wireless network to the second wireless network; and
            if the device is not connected to the first wireless network,
                connect the device to the second wireless network, and
                place the emergency call to the endpoint over the second wireless network.

2. The device of claim 1, wherein the first wireless network is a 5G network and the second wireless network is a 4G network.

3. The device of claim 1, wherein when the device is handed off from the first wireless network to the second wireless network, an Access and Mobility Function (AMF) in the first wireless network sends information about the device to a Mobility Management Entity (MME) in the second wireless network.

4. The device of claim 1, wherein when the processor determines that the emergency call is successfully placed over the first wireless network, the first wireless network sends information indicating a location of the device to the endpoint or to the device.

5. The device of claim 4, wherein when the processor places the emergency call to the endpoint over the second wireless network after the device is handed off or redirected from the first wireless network to the second wireless network, and if the placed emergency call fails to connect the device to the endpoint over the second wireless network, the processor is configured to:
place an emergency call to the endpoint over a third wireless network.

6. The device of claim 1, wherein when the processor places the emergency call to the endpoint over the second wireless network after the device is handed off from the first wireless network to the second wireless network, the second wireless network sends information indicating a location of the device to the endpoint or to the device.

7. The device of claim 1, wherein when the processor selects the second wireless network as the primary network and performs the fallback emergency call procedure, the processor is further configured to:
determine if the device is still connected to the first wireless network;
if the processor determines that the device is still connected to the first wireless network,
send a second request to the first wireless network to hand off or redirect the device from the first wireless network to the second wireless network, and
after the device is handed off or redirected from the first wireless network to the second wireless network, place an emergency call to the endpoint over the second wireless network; and
if the processor determines that the device is not connected to the first wireless network,
connect to the second wireless network, and
place an emergency call to the endpoint over the second wireless network.

8. The device of claim 7, wherein after the device is handed off or redirected from the first wireless network to the second wireless network and the processor places the emergency call to the endpoint over the second wireless network, the processor is further configured to:
if the placed emergency call to the endpoint over the second wireless network fails, make an emergency call to the endpoint over a third wireless network.

9. The device of claim 8, wherein if the emergency call to the endpoint over the third wireless network fails, the processor is configured to:
connect to the first wireless network; and
place an emergency call to the end point over the first wireless network.

10. The device of claim 1, wherein the endpoint includes a Public Safety Answering Point.

11. The device of claim 1, wherein the particular service obtains position information of the device based on Observed Time Difference of Arrival (OTDOA).

12. The device of claim 1, wherein the particular services includes at least one of:
an Assisted Global Positioning System (A-GPS) positioning service;
a wireless network positioning service; or
an E-Cell identifier (E-CID) positioning service.

13. A method comprising:
connecting a device to a first wireless network;
determining whether the first wireless network provides a particular service for determining a position of the device more accurately than a location service provided by a second wireless network, whether the first wireless network provides an emergency call service, and whether the first wireless network provides an emergency call service fallback;
selecting the first wireless network as a primary network if the first wireless network provides the emergency call service and the particular service;
selecting the second wireless network as the primary network if the first wireless network does not provide the emergency call service or the particular service;
if the first wireless network is selected as the primary network, sending a first request from the device to the first wireless network to make an emergency call from the device to an endpoint over the first wireless network; and
if the second wireless network is selected as the primary network, performing a fallback emergency call procedure using the second wireless network to connect the device to the endpoint;
after the first wireless network attempts to place the emergency call in response to the first request, determining whether the emergency call is successfully placed over the first wireless network; and
if the emergency call is not successfully placed,
determining whether the device is still connected to the first wireless network,
if the device is still connected to the first wireless network,
sending a second request to the first wireless network to hand off or redirect the device from the first wireless network to the second wireless network, and
placing the emergency call to the endpoint over the second wireless network after the device is handed off or redirected from the first wireless network to the second wireless network; and
if the device is not connected to the first wireless network,
connecting the device to the second wireless network, and
placing the emergency call to the endpoint over the second wireless network.

14. The method of claim 13, wherein the handing off includes:
sending information about the device from an Access and Mobility Function (AMF) in the first wireless network to a Mobility Management Entity (MME) in the second wireless network.

15. The method of claim 13, further comprising:
if the emergency call is successfully placed over the first wireless network, sending information indicating a location of the device from the first wireless network to the endpoint or to the device.

16. The method of claim 13, wherein performing the fallback emergency call procedure comprises:
determining if the device is still connected to the first wireless network;
if it is determined that the device is still connected to the first wireless network,
sending a second request to the first wireless network to hand off redirect the device from the first wireless network to the second wireless network, and
after the device is handed off or redirected from the first wireless network to the second wireless network, placing an emergency call to the endpoint over the second wireless network; and
if it is determined that the device is not connected to the first wireless network,
connecting to the second wireless network, and
placing the emergency call to the endpoint over the second wireless network.

17. The method of claim 13, wherein the particular services includes at least one of:

an Assisted Global Positioning System (A-GPS) positioning service;
a wireless network positioning service; or
an E-Cell identifier (E-CID) positioning service.

18. A non-transient computer-readable medium, comprising computer-executable instructions, that when executed by a processor, cause the processor to:
connect a device that includes the processor to a first wireless network;
determine whether the first wireless network provides a particular service for determining a position of the device more accurately than a location service provided by a second wireless network, whether the first wireless network provides an emergency call service, and whether the first wireless network provides an emergency call service fallback;
select the first wireless network as a primary network if the first wireless network provides the emergency call service and the particular service;
select the second wireless network as the primary network if the first wireless network does not provide the emergency call service or the particular service;
if the processor selects the first wireless network as the primary network, send a first request from the device to the first wireless network to make an emergency call from the device to an endpoint over the first wireless network; and
if the processor selects the second wireless network as the primary network, perform a fallback emergency call procedure using the second wireless network to connect the device to the endpoint;
after the first wireless network attempts to place the emergency call in response to the first request, determine whether the emergency call is successfully placed over the first wireless network; and
if the emergency call is not successfully placed,
determine whether the device is still connected to the first wireless network,
if it is determined that the device is still connected to the first wireless network,
send a second request to the first wireless network to hand off or redirect the device from the first wireless network to the second wireless network, and
place the emergency call to the endpoint over the second wireless network after the device is handed off or redirected from the first wireless network to the second wireless network; and
if it is determined that the device is not connected to the first wireless network,
connect the device to the second wireless network, and
place the emergency call to the endpoint over the second wireless network.

19. The non-transient computer-readable medium of claim 18, wherein the processor is further to:
determine if the device is still connected to the first wireless network;
if the device is still connected to the first wireless network,
send a second request to the first wireless network to hand off or redirect the device from the first wireless network to the second wireless network, and
after the device is handed off or redirected from the first wireless network to the second wireless network, place an emergency call to the endpoint over the second wireless network; and
if the device is not connected to the first wireless network,
connect to the second wireless network, and
place an emergency call to the endpoint over the second wireless network.

20. The non-transient computer-readable medium of claim 18, wherein the particular services includes at least one of:
an Assisted Global Positioning System (A-GPS) positioning service;
a wireless network positioning service; or
an E-Cell identifier (E-CID) positioning service.

* * * * *